United States Patent
Abburi

(10) Patent No.: US 7,130,390 B2
(45) Date of Patent: Oct. 31, 2006

(54) AUDIO MESSAGING SYSTEM AND METHOD

(75) Inventor: Rajasekhar Abburi, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 10/061,656

(22) Filed: Feb. 1, 2002

(65) Prior Publication Data

US 2003/0147512 A1 Aug. 7, 2003

(51) Int. Cl.
*H04M 1/64* (2006.01)
(52) U.S. Cl. .............................. 379/88.17; 379/88.25; 370/401
(58) Field of Classification Search ............ 379/88.04, 379/88.22, 88.14, 88.17, 112.06, 102.01, 379/102.02, 88.18; 340/7.21; 370/401; 455/414
See application file for complete search history.

(56) References Cited

U.S. PATENT DOCUMENTS

| | | | | |
|---|---|---|---|---|
| 5,568,539 A | * | 10/1996 | Bergsman et al. | 379/88.22 |
| 5,740,233 A | * | 4/1998 | Cave et al. | 379/112.06 |
| 5,896,448 A | * | 4/1999 | Holt | 379/221.03 |
| 6,233,318 B1 | * | 5/2001 | Picard et al. | 379/88.17 |
| 6,330,308 B1 | * | 12/2001 | Cheston et al. | 379/88.04 |
| 6,385,202 B1 | * | 5/2002 | Katseff et al. | 370/401 |
| 6,396,908 B1 | * | 5/2002 | O'Donovan et al. | 379/88.22 |
| 6,507,643 B1 | * | 1/2003 | Groner | 379/88.14 |
| 6,538,561 B1 | * | 3/2003 | Angus | 340/7.21 |
| 6,683,940 B1 | * | 1/2004 | Contractor | 379/88.17 |
| 6,823,047 B1 | * | 11/2004 | Cruickshank | 379/88.18 |
| 2002/0032689 A1 | * | 3/2002 | Abbott et al. | 707/104.1 |
| 2003/0087632 A1 | * | 5/2003 | Sagi et al. | 455/414 |

OTHER PUBLICATIONS

Terry, D., et al., "Managing Stored Voice in the Etherphone System," ACM Symposium on Operating Systems Principles", Proceedings of the Eleventh ACM Symposium on Operating Systems Principles, 1987, pp. 103-104, ACM Press, New York, NY, USA.

Herlein, Greg, et al., "The Cutting Edge", Linux Journal, Sep. 1999, vol. 1999, Issue 65es, Specialized Systems Consultants, Inc., Seattle, WA, USA (5 pages).

Herlein, Greg, "The OpenPhone Project—Internet Telephony for Everyone!", Linux Journal, Jan. 2000, vol. 2000, Issue 69es, Specialized Systems Consultants, Inc., Seattle, WA, USA (7 pages).

Searls, Doc, "The Next Bang: The Explosive Combination of Embedded Linux, XML and Instant Messaging", Linux Journal, Sep. 2000, vol. 2000, Issue 77es, Specialized Systems Consultants, Inc., Seattle, WA, USA (10 pages).

(Continued)

*Primary Examiner*—Gerald Gauthier
(74) *Attorney, Agent, or Firm*—Senniger Powers

(57) ABSTRACT

A system and method by which individuals can send and receive audio messages using telephone devices and/or computer devices. Upon receiving an audio message on behalf of an intended recipient, the system accesses a user profile to determine how the intended recipient should be contacted. The system then contacts the intended recipient in accordance with his or her user profile and notifies the intended recipient of the received audio message. The audio message is then delivered to the intended recipient in audio form through either a computer device or a telephone device. A person may thus send a voice or other audio message to an intended recipient using either a computer device or a telephone device, at the sender's option, and the audio message may be promptly delivered to the intended recipient in audio form via either a computer device or a telephone device, at the recipient's option.

43 Claims, 4 Drawing Sheets

OTHER PUBLICATIONS

Milewski, Allen E., et al., "Providing Presence Cues to Telephone Users", Computer Supported Cooperative Work, Proceeding of the ACM 2000 Conference on Computer Supported Cooperative Work, 2000, pp. 89-96, ACM Press, New York, NY USA.

Meech, John F., et al., "A Multi-Agent System for Personal Messaging", International Conference on Autonomous Agents, Proceedings of the Fourth International Conference on Autonomous Agents, 2000, pp. 144-145, ACM Press, New York, NY, USA.

Jiang, Wenyu, et al., "Towards Junking the PBX: Deploying IP Telephony", International Workshop on Network and Operating System Support for Digital Audio and Video, 11th International Workshop on Network and Operating Systems Support for Digital Audio and Video, 2001, pp. 177-185, ACM Press, New York, NY, USA.

Liscano, Ramiro, et al., "A System for the Seamless Integraton of Personal Messages Using Agents Developed on a Lotus Notes Platform", 1996, CASCON, USA (9 pages).

Liscano, Ramiro, et al, "Integrating Multi-Modal Messages Across Heterogeneous Networks", Proceedings of the IEEE International Conference on Communications, 1997, Canada (9 pages).

Abu-Hakima, Suhayya, et al., "Cooperative Agents That Adapt for Seamless Messaging in Heterogeneous Communication Networks", Workshop Proceedings of the AAAI-96 on Intelligent Adaptive Agents, 1996, USA (10 pages).

* cited by examiner

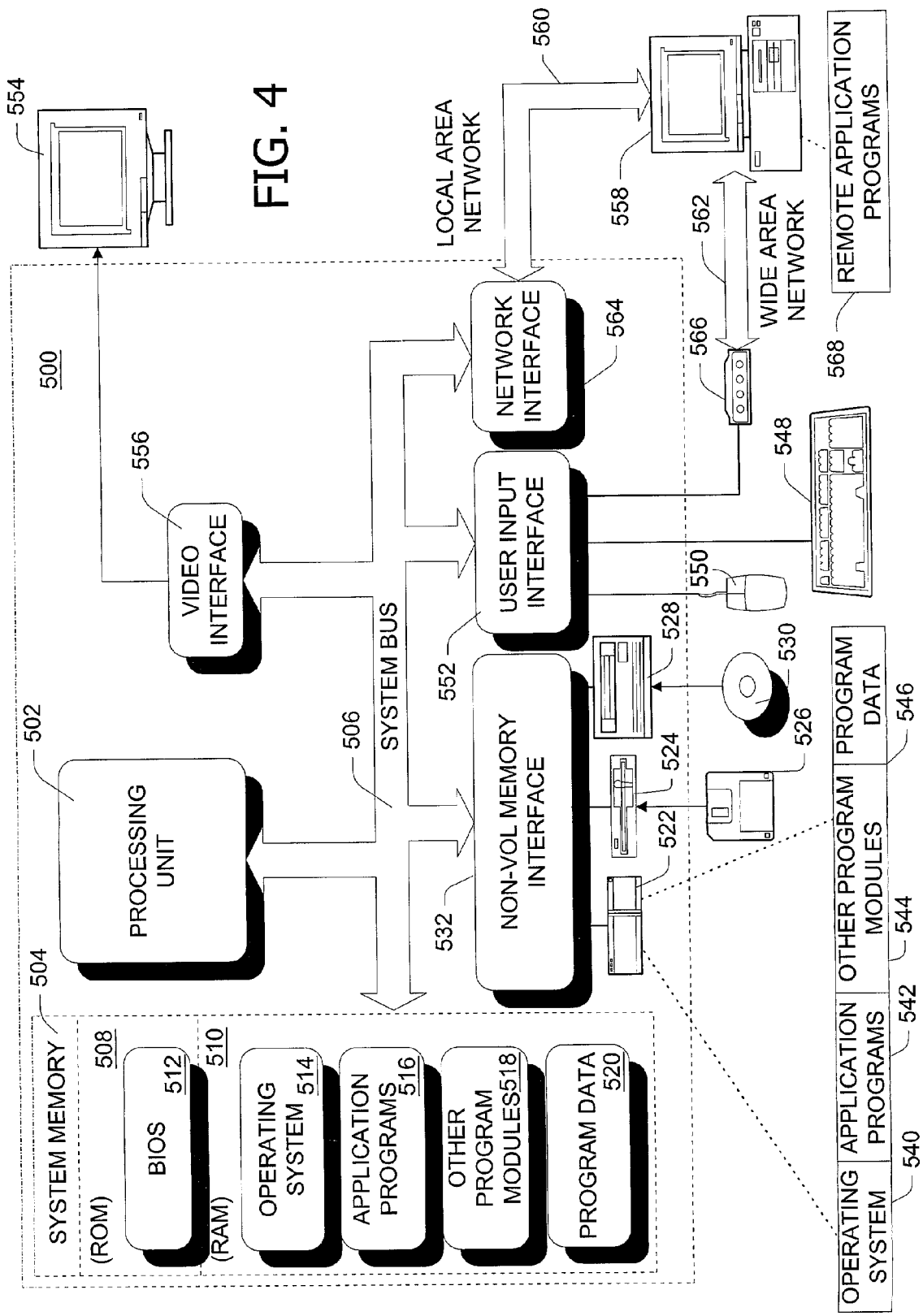

AUDIO MESSAGING SYSTEM AND METHOD

TECHNICAL FIELD OF THE INVENTION

The present invention relates generally to messaging systems and methods, and more particularly to audio (including voice) messaging between individuals through telecommunications and/or computer networks.

BACKGROUND OF THE INVENTION

More messaging devices and systems are available today than perhaps ever before, providing individuals with numerous ways to communicate and exchange messages with one another. In addition to (or in lieu of) some of the earliest messaging options, including personal messengers, telegrams, telegraphs, and mail systems, individuals today can communicate and exchange messages via telephone answering machines and voice mail systems, email, pagers, etc. An even more recent development is the instant messaging system, where online users can exchange pop-up text messages over the Internet in near real time (thus the term "instant").

Nevertheless, there are limitations to the effectiveness and convenience of these messaging options, as recognized by the inventor hereof. For example, if one party calls another by phone with the intention of leaving a voice message, the call may actually be answered before an answering machine or voice mail system is reached, possibly resulting in a lengthy (and perhaps unwanted) phone conversation. Further, even if the answering machine or voice mail system is reached as desired, the resulting voice message might not be retrieved by the intended recipient for an extended period of time. Alternatively, a party could send a text message via email or an instant messaging system, provided that party has Internet access. In the case of instant messaging, however, the intended recipient must typically have a presence on the Internet at the time the instant message is to be sent. Otherwise, the party seeking to send the message may be forced to use another communication option, such as email. Similar to voice mail, however, an email message may sit idle in the recipient's inbox for an extended period of time before the recipient checks for new messages.

The advent of unified messaging and similar systems overcame some of these shortcomings. For example, a unified messaging system may receive and record a voice message from a caller on behalf of a user, and then notify and provide the received voice message to the user via one or more user-specified communication devices, such as a personal computer connected to the Internet, possibly after converting the received voice message into a text message or electronic file.

As recognized by the inventor, however, the ability to conveniently record and send voice and other audio messages via any desired type of communication device (e.g., from computer devices in addition to phone devices), and to promptly receive such messages in audio form via any desired type of communication device, is still lacking.

SUMMARY OF THE INVENTION

In order to solve these and other needs in the art, the inventor hereof has succeeded at designing improvements in messaging by which individuals can send and receive voice and other audio messages, in audio form, using telephone devices located on a telecommunications network and/or computer devices located on a widely distributed computer network. Upon receiving an audio message on behalf of an intended recipient, the system accesses a user profile to determine how the intended recipient should be contacted. The system then contacts the intended recipient in accordance with his or her user profile and notifies the intended recipient of the received audio message. The audio message is then delivered to the intended recipient in audio form through either a computer device located on the widely distributed computer network or a telephone device located on the telecommunications network. In this manner, a person may send a voice or other audio message to an intended recipient using either a computer device or a telephone device, at the sender's option, and the audio message may be promptly delivered to the intended recipient in audio form via either a computer device or a telephone device, at the recipient's option.

According to one aspect of the invention, a method uses an interactive voice response (IVR) system and a computer server connected to a communications network to support voice messaging between individuals accessible through telephone devices located on the network and individuals accessible through computer devices located on the network. The method includes receiving a plurality of voice messages from remote users of devices located on the network, where each received voice message includes information identifying at least one intended recipient. The method further includes, for each received voice message, accessing a user profile for its intended recipient. The user profile specifies one or more communication devices (including at least one of a telephone device and a computer device) located on the network by which such intended recipient should receive delivery or notification of voice messages directed to such intended recipient. The method further includes notifying the intended recipients of the received voice messages according to their respective user profiles, and delivering the received voice messages to their intended recipients in audio form, including delivering at least one of the received voice messages to its intended recipient in audio form using the IVR system and a telephone device specified in the user profile of the intended recipient, and delivering at least one other of the received voice messages to its intended recipient in audio form using the computer server and a computer device specified in the user profile of the intended recipient.

According to another aspect of the invention, an apparatus for recording and sending audio messages to one or more remote devices includes a processor, a memory device, computer instructions stored in the memory device, a microphone, and an interface to a communications network. The computer instructions configure the processor to record in an audio file, in response to input from a user, an audio message provided by the user to the microphone, and to transfer the audio file in which the audio message is recorded to the communications network via said interface, whereby the audio message recorded in the audio file may be transmitted through the communications network for delivery to said one or more remote devices.

According to a further aspect of the invention, a method for recording and sending an audio message to one or more remote devices using a computer device having a microphone and a network interface includes receiving the audio message from a user through the microphone, recording the received audio message in an audio file, and sending the audio file to the network interface for delivery to said one or more remote devices through a communications network.

According to yet another aspect of the invention, a method of supporting messaging between individuals over a widely distributed computer network includes providing an instant messaging system by which individuals having a presence on the widely distributed computer network at the same time can send pop-up text messages to one another, and providing a voice messaging option within said instant messaging system by which individuals can record and send voice messages to one another through the widely distributed computer network.

A method according to still another aspect of the invention includes receiving a voice message on behalf of an intended recipient from a remote device over a communications network, storing the received voice message, determining whether the intended recipient has a presence on a widely distributed computer network, and, if the intended recipient has a presence on the widely distributed computer network, sending an electronic message to the intended recipient via the widely distributed computer network, the electronic message notifying the intended recipient of the received voice message.

A method according to yet another aspect of the invention includes receiving a voice message on behalf of an intended recipient, storing the received voice message, and sending an electronic message to the intended recipient, the electronic message including a hyperlink to the stored voice message, whereby the intended recipient can retrieve the stored voice message by selecting the hyperlink.

A method according to a further aspect of the invention includes receiving a telephone call from a user having a predefined group of contacts, determining whether said contacts currently have a presence on a widely distributed computer network, and advising the user through said telephone call regarding which of said contacts were determined to currently have a presence on the widely distributed computer network.

A method according to still another aspect of the invention includes receiving information from a first device associated with a user indicating the user's desire to record and send an audio message, contacting the user via a second device associated with the user, and receiving the audio message from the user via the second device.

Other features and advantages of the invention will be in part apparent and in part pointed out below.

BRIEF DESCRIPTION OF THE DRAWINGS

FIG. 4 is a block diagram of an exemplary computer device for use in the present invention.

Corresponding reference characters indicate corresponding features throughout the several views of the drawings.

DETAILED DESCRIPTION OF PREFERRED EMBODIMENTS

Figure 1:
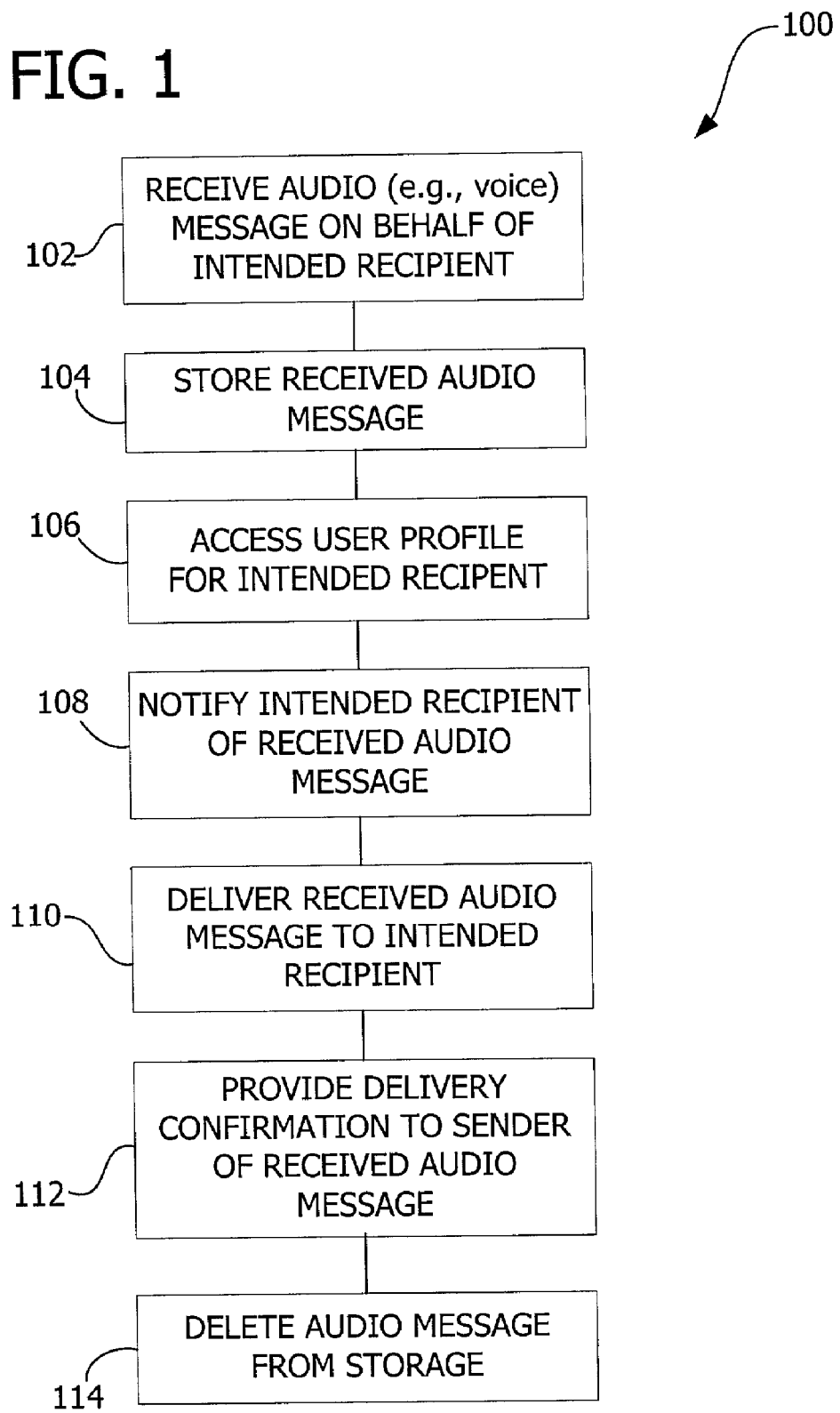
FIG. 1 is a flow diagram illustrating a method of supporting audio messaging between individuals according to one embodiment of the present invention.

A method of supporting audio messaging between individuals according to one embodiment of the invention is illustrated in FIG. 1 and designated generally by reference character 100. As shown in FIG. 1, the method 100 includes receiving, at block 102, an audio (e.g., voice) message on behalf of an intended recipient (i.e., on behalf of the party to whom the message is directed), and storing the received audio message at block 104. At block 106, a user profile for the intended recipient of the message is accessed to determine how to contact the intended recipient (e.g., via a particular phone device, a computer device, etc.). The intended recipient is then notified of the received audio message at block 108. At block 110, the received audio message is delivered to the intended recipient, such as by audio streaming of the message through a telecommunications and/or computer network. At block 112, confirmation that the audio message has been delivered to the intended recipient is provided to the message sender. The received audio message is then deleted from storage, as indicated in block 114 of FIG. 1.

As described further below, the audio message may be received from a variety of device types, including telephone and computer devices, and a variety of device types can be used to notify the intended recipient that the audio message has been received, and to deliver the audio message to the intended recipient. For instance, the audio message may be received from the message sender via a telephone device, the intended recipient may be notified of the received message via a computer device such as a personal computer connected to the Internet, and the audio message may be delivered to the intended recipient via a telephone device specified by the intended recipient. Thus, it should be understood that the method 100 allows users to send and receive audio messages using any type of communication device(s) available to or selected by those users. It should also be understood that some of the steps illustrated in FIG. 1 may be eliminated and/or performed in a sequence other than that described above, if desired for any given implementation, without departing from the scope of the invention.

Figure 2:
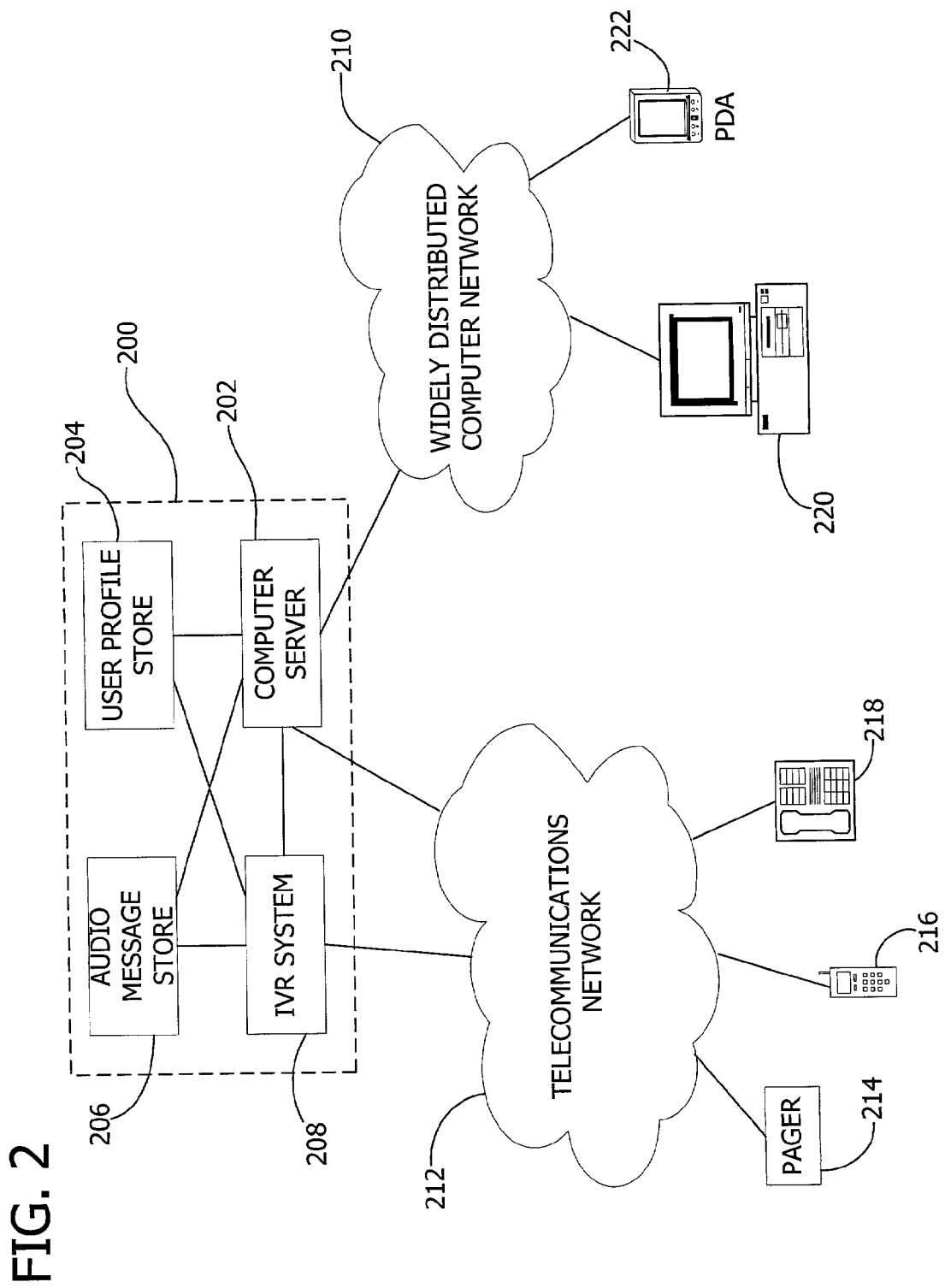
FIG. 2 is a block diagram of an exemplary system for implementing the method of FIG. 1.

One system for implementing the method 100 of FIG. 1 is illustrated in FIG. 2 and designated generally by reference character 200. The system 200 includes a computer server 202 (e.g., a Web server), a user profile store 204, an audio message store 206 and an interactive voice response (IVR) system 208. As shown in FIG. 2, the computer server 202 and the IVR system 208 are connected to a widely distributed computer network 210 (e.g., the Internet) and a telecommunications network 212 (e.g., the public telephone system), respectively, as well as to each other. The computer server 202 is also shown connected to the telecommunications network 212 for sending messages and notifications to and/or receiving messages from telephony devices capable of exchanging information with the computer server 202 directly using a suitable protocol, such as the wireless application protocol (WAP). Additionally, the computer server 202 and the IVR system 208 are each connected to the user profile store 204 and the audio message store 206. As a result of these various connections, and logic (e.g., computer-executable instructions) stored in the computer server 202 and the IVR system 208, the system 200 can receive audio messages from and send audio messages to any device connected to the computer network 210 or the telecommunications network 212, including but not limited to a pager 214, a mobile phone 216, a conventional telephone 218, a desktop computer 220, a handheld computer 222, and the like, as shown illustratively in FIG. 2. While only a limited number of devices 214–222 are shown connected to the networks 210, 212 in FIG. 2, it should be understood that a large number of such devices can be supported by the system 200.

Although only one computer server 202, user profile store 204, audio message store 206 and IVR system 208 are shown in FIG. 2, it should be understood that more than one of each such component may be necessary or desired for any particular implementation of the invention. Further, while devices 214–222 are shown connected to either the computer network 210 or the telecommunications network 212, those skilled in the art will appreciate that certain devices will communicate with the system 200 through both the computer network and the telecommunications network. For example, the personal computer device 220 can connect to the computer network 220 using the telecommunications network 212 and a modem. Further, while the computer network 210 and the telecommunications network 212 are illustrated in FIG. 2 as distinct from one another, this is not a requirement of the invention. The computer network 210 and the telecommunications network 212 may instead be integrated in a single communications network.

Referring again to FIG. 1, the particular mode(s) used to notify an intended recipient of a received audio message in block 108, and to deliver such audio message to the intended recipient in block 110, are specified in one embodiment by the intended recipient in advance and stored in the user profile store 204 of FIG. 2. Thus, the user profile store 204 contains configuration settings for each user of the system 200. Similarly, the mode(s) used to provide delivery confirmation to a message sender are specified in a user profile for the message sender in this embodiment.

If a message is received by the system 200 on behalf of a user having no profile stored in the user profile store 204, the system 200 may refuse the message or, alternatively, require the message sender to provide information for addressing a communication device associated with the intended recipient, such as a telephone number or email address. In the latter case, the system 200 may use the provided phone number or email address for contacting the intended recipient and delivering the received audio message.

If an intended recipient's profile specifies, for example, several devices for contacting that user, the system attempts to notify the user of a received audio message through each such device, either sequentially or contemporaneously as specified in the user's profile, until the user is reached. If the system 200 cannot confirm that the intended recipient has been reached, the default may be to leave a voice message for the intended recipient at a particular telephone number, or to send an electronic message, etc., as specified in the user's profile. The user's profile may also specify the order in which certain devices should be contacted by the system, and/or when to use a particular device (e.g., use the mobile telephone number during specified commute times, use the business phone number during specified business hours, use the pager number during specified evening hours, etc.).

In one embodiment, the system 200 of FIG. 2 also employs heuristics to determine how it should attempt to contact a particular user when necessary. For instance, the system 200 learns, over time, that a particular user is nearly always accessible via her mobile phone during certain hours of the day and adjusts the user's profile accordingly. Similarly, the system 200 may attempt to contact a user via the device most recently used by the system 200 to make successful contact, etc.

Regardless of the mode used to deliver a message or notification to an intended recipient, the system 200 provides the recipient with various options to act on such message, including, e.g., acknowledging receipt of the message, saving the audio message on the system 200, downloading the audio message for storage by the recipient, replaying, replying to or forwarding the received audio message, initiating a new audio message, etc.

As alluded to above, a person interested in sending a voice or other audio message to a particular individual may dial into the IVR system 208 using a telephone device. In one embodiment, the particular phone number (e.g., local or toll-free) employed for this purpose is a unique phone number provisioned by the system 200 to the intended recipient of the message. Alternatively, a general phone number for the IVR system 208 is employed, with the caller then identifying the intended recipient of the message, such as by punching in the name of the intended recipient or a particular extension number using DTMF keys, speaking the name of the intended recipient, providing such input through a computer device connected to the computer network 210, etc. The caller may also be required to authenticate himself via a personal identification number, voice recognition, etc., unless the user profile for the caller provides for caller-ID to serve as adequate identification. The caller may further specify a computer or telephone device to which any replies to the message should be directed.

Once (or before) the intended recipient is specified, the caller may speak or otherwise provide an audio message to the IVR system 208. This audio message is stored by the IVR system 208 in the audio message store 206. The IVR system 208 then accesses a user profile for the intended recipient, stored in the user profile store 204, to determine how to notify the intended recipient of the received audio message. If, for example, the user profile indicates that the intended recipient should receive an email notification, the IVR system 208 sends appropriate information to the computer server 202, which then produces and sends the email notification, typically through the computer network 210. Alternatively, if the user profile indicates that the intended recipient should be notified of the received audio message by phone, the IVR system 208 places a telephone call to the intended recipient through the telecommunications network 212, and then notifies the intended recipient of the received message using, e.g., prerecorded or synthesized speech. The audio message may be delivered to the intended recipient at the same time as the message notification. Alternatively, the intended recipient may subsequently access the computer server 202 (e.g., using a computer device executing a web browser function) or the IVR system 208 (e.g., using a conventional telephone device) to initiate delivery of the audio message stored in the audio message store 206.

Audio messages are delivered to intended recipients in one embodiment via audio streaming through the computer network 210 or the telecommunications network 212. Alternatively, system 200 delivers an audio message to its intended recipient as, e.g., an electronic audio file which the recipient can store and subsequently playback at his or her option.

In one embodiment of the invention, an electronic message (e.g., an email message) notification sent to an intended recipient of an audio message includes a hyperlink for initiating delivery of the audio message. Thus, when the recipient clicks on or otherwise selects the hyperlink, the computer server 202 retrieves the audio message from the audio message store 206 and streams the audio message to the same device used by the intended recipient to activate the link. Additionally, when activating the hyperlink, the intended recipient may optionally specify a different output device to which the audio message should be delivered. As an example, if the intended recipient activates the hyperlink and specifies his or her business phone as the output device, the computer server 202 prompts the IVR system 208 to call that business phone number and provide the audio message by phone through the telecommunications network 212.

A person interested in sending a voice or other audio message to one or more individuals may also do so by accessing the computer server 202 through the computer network 210 using, for example, a personal computer having a web browser application. After (or before) identifying one or more individuals (or a predefined group of individuals) who should receive the audio message, the user may speak (or otherwise provide) the audio message to his or her computer's microphone for transmission to and recording by the system 200. Assuming the profile stored for an intended recipient of this message indicates that the message should be delivered to the intended recipient via a telephone device, the computer server 202 prompts the IVR system 208 to call such telephone device and deliver the message. When the phone device is answered, the IVR system 208 signals that an audio message has been received for the intended recipient by, for example, playing an introductory musical note, followed by synthesized (or prerecorded, by the message sender or another individual) speech identifying the sender and/or the intended recipient of the message. The intended recipient may then hear playback of the audio message through the phone device, or may optionally specify another output device to which the message should be delivered.

As an alternative to inputting the audio message to the system 200 using a microphone associated with the sender's personal computer, as noted above, the sender may optionally select a different device for inputting the message, such as a telephone device. In response, the system 200 prompts the IVR system 208 to call the designated phone device and, once answered, capture the audio message from the sender. In this manner, the sender may conveniently initiate an audio message via a computer device even if the computer device does not have a microphone, or in lieu of dialing into the IVR system 208 using a phone number which the message sender may have lost or forgotten, etc.

When specifying, in their user profiles, the particular output devices which the system 200 should contact for delivering messages and notifications, users may optionally designate each such output device as "private" or "shared." If a particular output device is marked as "shared," the system 200 will first perform an authentication process (e.g., via keyed input of a personal identification number (PIN), voice recognition, etc.) prior to delivering the audio message to the intended recipient through the shared device. Further, if the shared device is a telephone device which is answered by an answering machine or voice mail system, the system 200 may leave a message merely indicating that an audio message has been received for the intended recipient, and possibly specifying the sender of the message, if desired. Alternatively, the system 200 may be configured, via the user profile stored for the intended recipient, not to leave any message on a shared telephone device. On the other hand, if the system calls a "private" phone device which is answered by an answering machine or voice mail system, the system may be configured to leave a message which includes some or all of the received audio message.

Similarly, when initiating an audio message using the system 200, the message sender may optionally designate the message as "private." In such a case, if the system attempts to deliver the audio message to a telephone device which is answered by an answering machine or voice mail system, the system 200 is configured to leave a message which includes some or all of the received audio message only if the telephone device is a "private" device, and not a "shared" device. The system 200 may also be configured not to allow a message recipient to forward an audio message marked by the sender as "private" to any other party.

Figure 3:
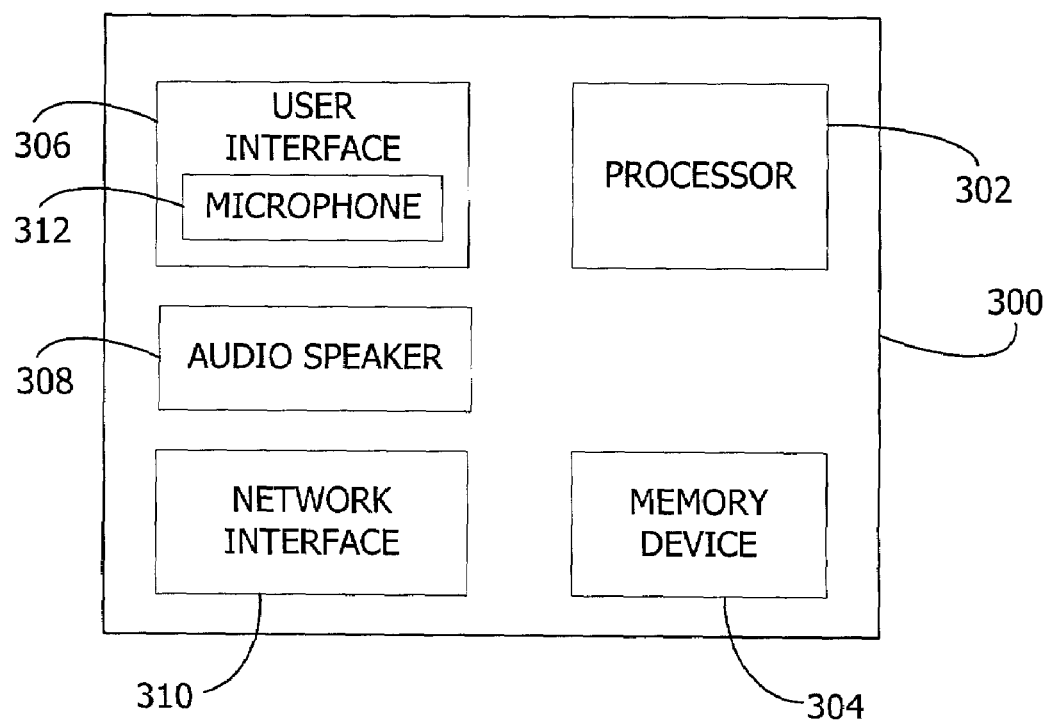
FIG. 3 is a block diagram of a user device configured to locally record and then transmit an audio message to a remote device.

FIG. 3 illustrates an exemplary user device 300 for providing a voice or other audio message to the system 200 for delivery of the message to its intended recipient(s). As shown in FIG. 3, the device 300 includes a processor 302, a memory device 304 (which, itself, may comprise one or more static and/or dynamic memory elements), a user interface 306, an audio speaker 308, and a network interface 310 for interfacing the device 300 with the computer network 210 and/or the telecommunications network 212. The user interface 306 includes, for example, a microphone 312 by which a user can input a spoken or other audio message for recording. In one embodiment, the microphone 312 is also used to receive spoken instructions from the user, with the processor 302 configured to implement speech recognition functionality using suitable computer-executable instructions stored in the memory device 304. The user interface 306 may also include, as desired, an alphanumeric keypad, a touch screen, a visual display with menu buttons, a mouse, a keyboard and/or any other user input device necessary or desirable for a given application of the device 300.

In operation, the user can initiate the sending of an audio message through appropriate input to the user interface 306. This input from the user includes information identifying one or more intended recipients of the audio message, possibly through a selection of such individuals from a contact list stored in the memory device 304. Alternatively, such a contact list may be stored on the system 200. In one embodiment, when the user initiates the sending of an audio message, the device 300 connects to the system 200 through the computer network 210 or the telecommunications network 212. The user provides the audio message to the microphone 310. The audio message is routed through the network interface 310 and transmitted through the computer network 210 and/or the telecommunications network 212 to the system 200 for recording, storage and delivery to the intended recipient(s).

Rather than transmitting the audio message to the system 200 for recording as the message is received by the device 300, the device 300 may be configured to record the audio message locally (e.g., into an audio file), and then transmit this prerecorded message to the system. For instance, device 300 in one embodiment records an audio message provided by the user into a WAV file, compresses the file, and then routes it to the network interface 310 for transmission to the system 200.

The user device 300 shown illustratively in FIG. 3 represents an appropriately configured computer device such as a desktop computer, handheld computer, or the like. Alternatively, or additionally, the user device 300 represents an appropriately configured telephone device such as a conventional or mobile telephone, a pager device with outbound capabilities, etc.

In one embodiment of the invention, each user device which communicates with the system 200 of FIG. 2 through the computer network 210 includes a network presence application for maintaining a "subscription" with the system 200 when such device is connected to the computer network 210 (unless the presence functionality is blocked at the user's option). In this manner, the system 200 can determine, at any given time, whether the corresponding user is readily accessible through the computer network 210 for delivery of a message or notification. For example, upon receiving an audio message for an intended recipient, the system 200 may determine whether the intended recipient of the message has a presence on the computer network 210 (i.e., whether the intended recipient is "online") and, if so, send an electronic message (e.g., an email message) notifying the intended recipient of the received audio message. As noted above, this electronic message may also include a hyperlink which, when activated by the intended recipient, initiates delivery of the audio message. The message may then be delivered to the user via audio streaming over the computer network 210, or via another output device (i.e., a computer or telephone device) specified by the intended recipient in his or her user profile or in response to the message notification. In this embodiment, if the system 200 determines that the intended recipient is not online, the system proceeds to notify the intended recipient through other means specified in the intended recipient's user profile.

If several of the user devices which communicate with the system 200 through the computer network 210 include a network presence application of the type noted above, each such device receives, when connected to the computer network 210, information from the system 200 indicating which of the corresponding user's "buddies" or contacts have a presence on the computer network 210 at that time. Additionally, when a user accesses or is contacted by the system 200 via the IVR system 208, the IVR system 208 advises the user by phone as to which of his buddies or contacts are online, and assists that user in sending an audio message to one or more of his buddies or contacts (whether online or not).

In one embodiment, in addition to supporting audio messaging between individuals, the system 200 also supports instant messaging (i.e., instant text messaging) between users connected to the computer network 210. The instant messaging functionality may be implemented entirely within the system 200, or through a system interface (not shown in FIG. 2) to a separate instant messaging system. Thus, if an intended recipient of an audio message is present on the computer network 210 when the audio message is received by the system 200, the system sends an instant text message to the intended recipient. As in the case of email messages, discussed above, the instant text message may include a hyperlink which the recipient can use to conveniently initiate delivery of the audio message.

In addition to receiving audio messages from users for delivery to others, the system 200 may also be configured to automatically generate and send audio messages upon the occurrence of predefined events. For example, the system 200 is configured to deliver an audio message to one or more users reporting on traffic, a stock movement, the outcome of a particular sporting event, etc., or to delivery an audio message at a particular time to serve as a reminder or wake-up call, etc.

In one embodiment, the system 200 is configured to limit the duration of audio messages provided by users for delivery by the system. Limiting the message duration reduces the time required to transmit messages through the telecommunications network 212 and/or the computer network 210. This, in turn, serves to minimize system costs, including the cost of using the telecommunications and computer networks, particularly where the network charges are based on usage time. In the case where network charges are assessed on a per minute basis (e.g., where the cost of each telephone call placed through the telecommunications network 212 is based on the duration of the call in minutes), the message length is limited to less than one minute (e.g., forty-five seconds) to ensure that the overall delivery time for a given message does not exceed one minute. In this manner, system costs may be reduced while still providing users with ample time to record their messages.

As noted above, messages are typically deleted from storage following delivery of the messages to their intended recipients. For example, messages may be immediately deleted upon successful delivery (similar to most instant text messages), or deleted within one day of playback, etc. Alternatively, users may be permitted to save some (or all) of their received messages for an extended period of time. In one embodiment, users can purchase additional storage to save more than a default number of received messages.

The following scenarios illustrate some of the preferred functionality of the system 200:

1. John wants to tell Mary that he will be late for dinner. John is in his office working on his laptop computer. He selects a "send audio message" icon next to Mary's name in a contact list and speaks into the computer microphone, leaving a short message saying that he will be late. The system takes that message and attempts to deliver it to Mary, by trying her home phone, work phone and cell phone. The system finally reaches Mary on her cell phone and plays John's message after a brief musical note signaling the voice message and a prerecorded message (by John) stating John's name. Mary replies to that message with an audio message saying that she would rather cancel the dinner. John receives an instant text message with a hyperlink to Mary's message. He selects the hyperlink, hears Mary's message, and sends a short reply by pressing the "send audio message" icon and talking into the computer microphone, saying he is fine with that. Again, the message is delivered to Mary on her cell phone.

2. John is at a conference and uses one of the public computers to check his email account. While he is doing that, he receives an instant text message notifying him that an audio message was received on his behalf from Mary. John selects a hyperlink in the instant text message but chooses his cell phone for playback. His cell phone rings. When he answers his cell phone, Mary's voice message is played.

3. John wants to send a voice message to Sue. He cannot find the microphone for his computer. He selects a "send audio message" icon on his computer and chooses his desk phone as the input device. His desk phone rings. John picks up the phone and speaks a short message to the IVR system. The IVR system delivers the voice message to Sue.

4. John sends a "private" voice message to Mary. Mary's home phone number is marked as "shared" in her user profile. When the IVR system calls Mary's home number and reaches the answering machine (e.g., Mary is not available to answer the call and key in her personal identification number), it leaves a synthesized voice message advising that Mary received a voice message from John. However, when the system calls Mary's work number, which is marked as "private," John's entire message is left on her work answering machine.

5. When Mary calls the IVR system via a toll free number to retrieve her voice messages, she enters a personal identification number and the voice messages are played. The IVR system then advises Mary regarding which of her "buddies" are online and which ones are not. Mary then initiates a voice message to one of her buddies using voice commands and the speech recognition function of the IVR system.

6. John signs up to receive automated sports updates in audio form. At the conclusion of a Mariner's game, while John is on a business trip in Miami, John answers a call to his mobile phone and receives a synthesized voice message with a report of the final score.

FIG. 4 shows one example of a general purpose computing device in the form of a computer 500. In one embodiment of the invention, a computer such as the computer 500 is suitable for use as the computer server 202 shown in FIG. 2 or as the user device 300 shown in FIG. 3. However, it should be understood that the computer server 202 of FIG. 2 need not be a conventional personal computer. Similarly, the user device 300 of FIG. 3 need not be a conventional personal computer, and may instead by any device configured to communicate with the computer network 210 and/or the telecommunications network 212, as applicable, including handheld devices, mobile phones, mini-browsers, and the like.

As illustrated in FIG. 4, computer 500 has one or more processors or processing units 502 and a system memory 504. A system bus 506 couples various system components including the system memory 504 to the processors 502. The bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically has at least some form of computer readable media. Computer readable media, which include both volatile and nonvolatile media, removable and non-removable media, may be any available medium that can be accessed by computer 500. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 500. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 504 includes computer storage media in the form of removable and/or non-removable, volatile and/or nonvolatile memory. In the exemplary computer 500 illustrated in FIG. 4, system memory 504 includes read only memory (ROM) 508 and random access memory (RAM) 510. A basic input/output system 512 (BIOS), containing the basic routines that help to transfer information between elements within computer 500, such as during startup, is typically stored in ROM 508. RAM 510 typically contains data and/or program modules that are immediately accessible to and/or presently being operated on by processing unit 502. By way of example, and not limitation, FIG. 4 illustrates operating system 514, application programs 516, other program modules 518, and program data 520.

The computer 500 may also include other removable/non-removable, volatile/nonvolatile computer storage media. For example, FIG. 4 illustrates a hard disk drive 522 that reads from or writes to non-removable, nonvolatile magnetic media. FIG. 4 also shows a magnetic disk drive 524 that reads from or writes to a removable, nonvolatile magnetic disk 526, and an optical disk drive 528 that reads from or writes to a removable, nonvolatile optical disk 530 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 522, and magnetic disk drive 524 and optical disk drive 528 are typically connected to the system bus 506 by a non-volatile memory interface, such as interface 532.

The drives or other mass storage devices and their associated computer storage media discussed above and illustrated in FIG. 4, provide storage of computer readable instructions, data structures, program modules and other data for the computer 500. In FIG. 4, for example, hard disk drive 522 is illustrated as storing operating system 540, application programs 542, other program modules 544, and program data 546. Note that these components can either be the same as or different from operating system 514, application programs 516, other program modules 518, and program data 520. Operating system 540, application programs 542, other program modules 544, and program data 546 are given different numbers here to illustrate that, at a minimum, they are different copies.

A user may enter commands and information into computer 500 through input devices such as a keyboard 548 and a pointing device 550 (e.g., a mouse, trackball, pen, or touch pad). Other input devices (not shown) may include a microphone, joystick, game pad, satellite dish, scanner, or the like. These and other input devices are connected to processing unit 502 through a user input interface 552 that is coupled to system bus 506, but may be connected by other interface and bus structures, such as a parallel port, game port, or a universal serial bus (USB). A monitor 544 or other type of display device is also connected to system bus 506 via an interface, such as a video interface 556. In addition to the monitor 554, computers often include other peripheral output devices (not shown) such as a printer and speakers, which may be connected through an output peripheral interface (not shown).

The computer 500 may operate in a networked environment using logical connections to one or more remote computers, such as a remote computer 558. The remote computer 558 may be a personal computer, a server, a router, a network PC, a peer device or other common network node, and typically includes many or all of the elements described above relative to computer 500. The logical connections depicted in FIG. 4 include a local area network (LAN) 560 and a wide area network (WAN) 562, but may also include other networks. Such networking environments are commonplace in offices, enterprise-wide computer networks, intranets, and global computer networks (e.g., the Internet).

When used in a local area networking environment, computer 500 is connected to the LAN 560 through a network interface or adapter 564. When used in a wide area networking environment, computer 500 typically includes a modem 566 or other means for establishing communications over the WAN 562, such as the Internet. The modem 566, which may be internal or external, is connected to system bus 506 via the user input interface 552, or other appropriate mechanism. In a networked environment, program modules depicted relative to computer 500, or portions thereof, may be stored in a remote memory storage device (not shown). By way of example, and not limitation, FIG. 4 illustrates remote application programs 568 as residing on the memory device. It will be appreciated that the network connections shown are exemplary and other means of establishing a communications link between the computers may be used.

Generally, the data processors of computer 500 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the functions described above in conjunction with a microprocessor or other data processor. The invention also includes the computer itself when programmed according to the methods and techniques described herein.

For purposes of illustration, programs and other executable program components, such as the operating system, are illustrated in FIG. 4 as discrete blocks. It is recognized, however, that such programs and components reside at various times in different storage components of the computer, and are executed by the data processor(s) of the computer.

Although preferred aspects of the invention have been described above as implemented in conjunction with both the widely distributed computer network 210 and the telecommunications network 212, it should be understood that the invention is not so limited. On the contrary, the invention may also be implemented, for example, as a telephony system only (i.e., without using the computer network 210), as a computer system only (i.e., without using the telecommunications network 212), etc.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of using an interactive voice response (IVR) system and a computer server connected to a communications network to support voice messaging between individuals accessible through telephone devices located on the network and individuals accessible through computer devices located on the network, the method comprising:
   receiving a plurality of voice messages from remote users of devices located on the network, each received voice message including information identifying at least one intended recipient;
   for each received voice message, accessing a user profile for its intended recipient, said user profile specifying one or more communication devices located on the network by which such intended recipient should receive delivery or notification of voice messages directed to such intended recipient, said communication devices including at least one of a telephone device and a computer device;
   determining, for each of the intended recipients, a preferred one of the specified communication devices by which such intended recipient should receive delivery or notification of voice messages directed to such intended recipient as a function of a time period during which the voice messages are received and updating the respective user profile accordingly;
   notifying the intended recipients of the received voice messages at the preferred communication devices according to their respective user profiles, said notifying including notifying the intended recipient of the received voice messages via the preferred device; and
   delivering the received voice messages to their intended recipients in audio form, including delivering at least one of the received voice messages to its intended recipient in audio form using the IVR system and the preferred communication device specified in the user profile of the intended recipient.

2. The method of claim 1 wherein delivering includes audio streaming the received voice messages to their intended recipients using the IVR system and the computer server.

3. The method of claim 1 wherein delivering includes delivering one of the received voice messages to its intended recipient through the communication device specified by such intended recipient in response to the notifying.

4. The method of claim 1 wherein notifying includes sending electronic messages to a plurality of the intended recipients, the electronic messages including hyperlinks to corresponding ones of the stored voice messages, whereby the plurality of intended recipients can initiate the delivering of associated voice messages by selecting the hyperlinks.

5. The method of claim 4 wherein said electronic messages include pop-up text messages.

6. The method of claim 1 wherein receiving includes receiving prerecorded voice messages from the remote users.

7. The method of claim 1 further comprising storing the received voice messages.

8. The method of claim 1 further comprising restricting a length of each voice message to less than one minute.

9. The method of claim 1 wherein at least one of the voice messages is received together with information for addressing the communication device associated with its intended recipient, the method further comprising delivering said one of the voice messages to its intended recipient using the information for addressing said communication device.

10. The method of claim 1 further comprising providing delivery confirmation to senders of the delivered voice messages.

11. The method of claim 1 wherein the communications network comprises a telecommunications network to which the IVR system is connected and a widely distributed computer network to which the computer server is connected, said IVR system and said computer server being connected to each other, and wherein the telephone devices are located on the telecommunications network and the computer devices are located on the widely distributed computer network.

12. The method of claim 11 further comprising receiving information via the computer server from a remote user of a computer device located on the widely distributed computer network, the received information indicating said remote user's desire to record a voice message using a telephone device located on the telecommunications network, and contacting such telephone device via the IVR system to capture such voice message.

13. The method of claim 11 further comprising supporting an instant text messaging option by which individuals having a presence on the widely distributed computer network at the same time can send pop-up text messages to one another through the widely distributed computer network.

14. The method of claim 13 wherein receiving voice messages via the IVR system includes receiving a telephone call via the IVR system from a user having a predefined group of contacts, determining whether said contacts currently have a presence on the widely distributed computer network, and advising the user via the IVR system regarding which of said contacts currently have a presence on the widely distributed computer network.

15. The method of claim 1 further comprising automatically generating a voice message upon an occurrence of a predefined event, and delivering the automatically generated voice message to one or more of the remote users.

16. A computer-readable medium having computer-executable instructions for performing the method recited in claim 1.

17. An apparatus for recording and sending audio messages to an interactive voice response (IVR) system coupled to a communications network for delivery to a recipient, the apparatus comprising:
   a processor;
   a memory device;
   computer instructions stored in the memory device;
   a microphone; and
   an interface to the communications network, said computer instructions configuring the processor to record in an audio file, in response to input from a user, an audio message provided by the user to the microphone, and to transfer the audio file in which the audio message is recorded to the communications network via, said interface, whereby the audio message recorded in the audio file may be transmitted through the communications network to the IVR system for delivery to the recipient via one or more remote devices specified in a profile of the recipient, and said computer instructions further configuring the processor to determine a preferred one of the one or more remote communication devices specified in the profile of the recipient at which to deliver the audio message as a function of a time period during which the audio message is provided by the user and to deliver the audio message to the intended recipient at the preferred communication device.

18. The apparatus of claim 17 wherein the computer instructions configure the processor to compress the audio file prior to transferring the audio file to the communications network via said interface.

19. The apparatus of claim 17 wherein the computer instructions configure the processor to limit a length of the audio message provided by the user to less than one minute.

20. The apparatus of claim 17 wherein the input from the user includes information identifying one or more individuals to whom the audio message should be sent, and wherein the computer instructions configure the processor to record said information in the audio file.

21. The apparatus of claim 20 wherein the computer instructions configure the processor to record information identifying said user in the audio file.

22. The apparatus of claim 17 wherein the apparatus is a telephony device, and wherein the communications network includes a telephony network.

23. The apparatus of claim 22 wherein the telephony device is a mobile telephony device, and wherein the telephony network is a wireless telephony network.

24. The apparatus of claim 17 wherein the apparatus is a computer device, and wherein the communications network includes a computer network.

25. The apparatus of claim 24 wherein the computer network is the Internet.

26. The apparatus of claim 24 wherein the computer device is a handheld computer device.

27. A method for recording and sending an audio message to an interactive voice response (IVR) system coupled to a communications network for delivery to a recipient using a computer device having a microphone and a network interface, the method comprising:
   receiving the audio message from a user through the microphone;
   recording the received audio message in an audio file;
   determining a preferred one of the one or more remote communication devices specified in a user profile associated with the recipient as a function of a time period during which the audio message is transferred to the audio file, said user profile specifying communication devices by which such recipient should receive delivery or notification of audio messages directed to the recipient, and updating the respective user profile accordingly; and
   sending the audio file to the network interface for delivery to the recipient at the preferred communication device via said IVR system through the communications network.

28. The method of claim 27 wherein recording includes recording the audio message in the audio file as the audio message is received.

29. The method of claim 27 wherein the audio message is a message spoken by the user.

30. The method of claim 27 further comprising compressing the audio file prior to sending.

31. The method of claim 27 further comprising receiving information from the user identifying one or more individuals to whom the audio message should be sent, and wherein recording includes recording said information in the audio file.

32. The method of claim 31 further comprising providing the user with a list of individuals to whom the audio message may be sent, and wherein receiving information includes receiving one or more selections by the user from said list.

33. The method of claim 32 further comprising supporting instant text messaging between said user and the individuals of said list.

34. A computer-readable medium having computer-executable instructions for performing the method recited in claim 33.

35. The method of claim 31 wherein receiving information includes receiving information for addressing one or more devices associated with said one or more individuals.

36. A computer-readable medium having computer-executable instructions for performing the method recited in claim 27.

37. A method comprising:
receiving a voice message on behalf of an intended recipient;
storing the received voice message;
determining a preferred one of one or more remote communication devices specified in a profile associated with the recipient as a function of a time period during which the voice message is received, said user profile specifying communication devices by which such recipient should receive delivery or notification of voice messages directed to the recipient, and updating the respective user profile accordingly;
sending an electronic message to the intended recipient, the electronic message including a hyperlink to the stored voice message, whereby the intended recipient can retrieve the stored voice message by selecting the hyperlink;
receiving information from the intended recipient specifying a device through which the intended recipient desires to receive the voice message;
contacting the device specified by the intended recipient; and
delivering the voice message to the intended recipient through the specified device.

38. The method of claim 37 further comprising automatically generating the voice message upon occurrence of a predefined event.

39. A computer-readable medium having computer-executable instructions for performing the method recited in claim 37.

40. A method comprising:
receiving information from a first device associated with a user indicating the user's desire to record and send an audio message;
contacting the user via a second device associated with the user;
receiving the audio message from the user via the second device;
determining whether an intended recipient of the received audio message has a presence on a widely distributed computer network at a particular time and, if so, contemporaneously sending a pop-up text message to the intended recipient, the pop-up text message notifying the intended recipient of the received audio message;
learning over time which one of a plurality of remote communication devices specified in a profile associated with the intended recipient is preferred at which to notify the intended recipient of the received audio message based on a time period during which previous audio messages have been successfully received by the intended recipient at each of the plurality of remote communication devices; and
updating the profile associated with the intended recipient accordingly.

41. The method of claim 40 wherein the first device is of a first device type and the second device is of a second device type different than the first device type.

42. The method of claim 41 wherein the first device type is a computer device, and wherein the second device type is a telephone device.

43. A computer-reliable medium having computer-executable instructions for performing the method recited in claim 40.

* * * * *